No. 873,330. PATENTED DEC. 10, 1907.
O. SELG.
HOP JACK.
APPLICATION FILED AUG. 30, 1907.
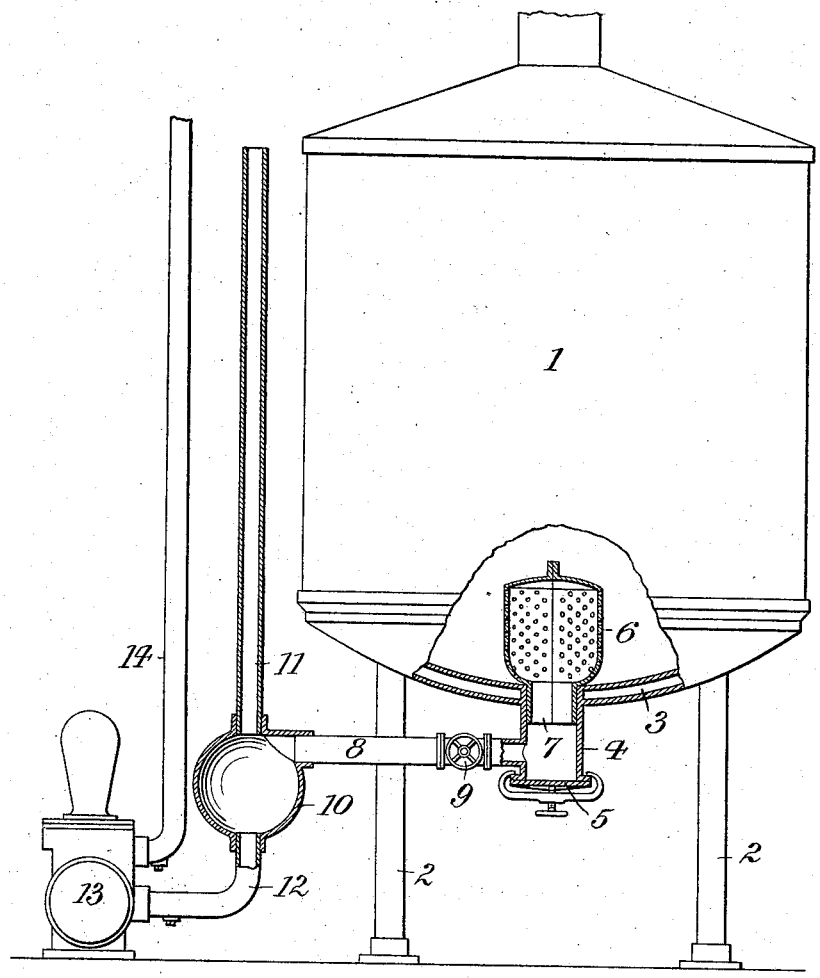
Witnesses:
Arthur E. Gumpe.
Adolph Miner.
Otto Selg Inventor
By his Attorney

UNITED STATES PATENT OFFICE.

OTTO SELG, OF NEW YORK, N. Y., ASSIGNOR TO THE SELG BREWERY APPARATUS CO., A CORPORATION OF NEW YORK.

HOP-JACK.

No. 873,330.  Specification of Letters Patent.  Patented Dec. 10, 1907.

Application filed August 30, 1907. Serial No. 390,725.

*To all whom it may concern:*

Be it known that I, OTTO SELG, a citizen of the United States, residing at New York city, Manhattan, county and State of New York, have invented new and useful Improvements in Hop-Jacks, of which the following is a specification.

This invention relates to a hop jack which is so constructed that the wort may be freely pumped therefrom without causing the hops to be drawn against the hop strainer by the sucking action of the pump. In this way the openings in the strainer remain unobstructed and the wort may be freely drawn from the hop jack to the cooler.

The accompanying drawing illustrates a side elevation, partly in section, of my improved hop jack.

The kettle 1, supported upon feet 2, has a curved double bottom 3, from the center of which depends an outlet tube 4 normally closed by cover 5. Within kettle 1 is contained a cylindrical hop strainer 6 having a lower neck 7 which is telescoped by the upper end of tube 4. This tube communicates by pipe 8 having cock 9 with an accumulator 10 of spherical or other shape. From the top of accumulator 10 extends upwardly a stand pipe 11 of suitable height and open at both ends. At the bottom accumulator 10 is by a discharge pipe 12 connected to a suitable pump 13 adapted to deliver the clear wort through pipe 14 to the cooler, (not shown).

In use, wort is introduced into kettle 1 where it is charged with hops and is boiled. After the boiling operation is completed valve 9 is opened so that the clear wort may flow through strainer 6 and pipe 8 into accumulator 10. Pump 13 being now started, will draw the liquid from accumulator 10 through pipe 12 and lift it through pipe 14 to the cooler. During the continuance of the operation described, the liquid will gradually flow more slowly through strainer 6, so that the body of liquid delivered to accumulator 10 will diminish. If this body is less than required for the full capacity of the pump, the latter will draw air through pipe 11 to compensate for the deficiency in liquid. In this way any suction against strainer 6, which would operate to pack the hops against such strainer, is prevented, and a continuous discharge of the clear wort is insured.

I claim:

In a hop jack, a kettle having an outlet tube, a hollow strainer within the kettle having a lower neck that engages said tube, an accumulator communicating with the tube, a stand pipe extending upwardly from the accumulator, and a pump operatively connected to the accumulator, substantially as specified.

Signed by me at New York city, (Manhattan,) N. Y., this 28th day of August, 1907.

OTTO SELG.

Witnesses:
W. R. SCHULZ,
FRANK V. BRIESEN.